(12) United States Patent
Yoon

(10) Patent No.: US 12,326,724 B2
(45) Date of Patent: Jun. 10, 2025

(54) SYSTEM AND METHOD FOR MONITORING MACHINE TOOL USING DIGITAL TWIN

(71) Applicant: YEONHAP SYSTEM CO., LTD., Gimpo-si (KR)

(72) Inventor: Joonsaam Yoon, Gimpo-si (KR)

(73) Assignee: YEONHAP SYSTEM CO., LTD., Gimpo-si (KR)

( * ) Notice: Subject to any disclaimer, the term of this patent is extended or adjusted under 35 U.S.C. 154(b) by 0 days.

(21) Appl. No.: 18/817,269

(22) Filed: Aug. 28, 2024

(65) Prior Publication Data

US 2024/0419155 A1  Dec. 19, 2024

Related U.S. Application Data

(63) Continuation of application No. PCT/KR2023/002815, filed on Feb. 28, 2023.

(51) Int. Cl.
*G05B 19/418* (2006.01)

(52) U.S. Cl.
CPC .... *G05B 19/41885* (2013.01); *G05B 19/41835* (2013.01); *G05B 19/4186* (2013.01)

(58) Field of Classification Search
CPC ........ G05B 19/41885; G05B 19/41835; G05B 19/4186
See application file for complete search history.

(56) References Cited

U.S. PATENT DOCUMENTS

| | | | |
|---|---|---|---|
| 6,963,817 B2 | 11/2005 | Ito et al. | |
| 6,985,831 B2 | 1/2006 | Ito et al. | |
| 7,263,459 B2 | 8/2007 | Ito et al. | |
| 2003/0154056 A1 | 8/2003 | Ito et al. | |
| 2004/0098218 A1 | 5/2004 | Ito et al. | |
| 2006/0052985 A1 | 3/2006 | Ito et al. | |
| 2019/0064787 A1* | 2/2019 | Maturana | G05B 23/0227 |
| 2020/0096976 A1* | 3/2020 | Maturana | G05B 19/41865 |

(Continued)

FOREIGN PATENT DOCUMENTS

| | | |
|---|---|---|
| KR | 10-2020-0045924 A | 5/2020 |
| KR | 10-2020-0071805 A | 6/2020 |

(Continued)

OTHER PUBLICATIONS

International Search Report of PCT/KR2023/002815 mailed May 24, 2023 from Korean Intellectual Property Office.

(Continued)

*Primary Examiner* — Christopher E. Everett
(74) *Attorney, Agent, or Firm* — Revolution IP, PLLC

(57) ABSTRACT

Disclosed is a system for monitoring a machine tool that communicates with an edge device using a digital twin, wherein the edge device may be configured to: request machining data for an operation of the machine tool in real time using a query different for each detailed process existing within one machining process to the machine tool, and receive data of a preset data format in response to corresponding machining data among the machining data from the machine tool, and wherein the machine tool may be configured to: generate machining data including at least one of cutting data, movement data, or standby data for an operation corresponding to the query, and transmit the machining data to the edge device in real time.

14 Claims, 17 Drawing Sheets

(56) References Cited

U.S. PATENT DOCUMENTS

| | | | |
|---|---|---|---|
| 2020/0225655 A1* | 7/2020 | Cella | G05B 19/41875 |
| 2020/0265329 A1* | 8/2020 | Thomsen | G06N 20/10 |
| 2021/0096551 A1* | 4/2021 | Sayyarrodsari | G06Q 10/06395 |
| 2022/0043431 A1* | 2/2022 | Sayyarrodsari | G05B 19/41835 |
| 2022/0078163 A1* | 3/2022 | Rotvold | H04L 63/0209 |
| 2022/0179392 A1* | 6/2022 | Tweedie | G05B 19/406 |

FOREIGN PATENT DOCUMENTS

| | | |
|---|---|---|
| KR | 10-2021-0062440 A | 5/2021 |
| KR | 10-2021-0065581 A | 6/2021 |
| KR | 10-2302798 B1 | 9/2021 |
| KR | 10-2022-0006294 A | 1/2022 |
| KR | 10-2351980 B1 | 1/2022 |

OTHER PUBLICATIONS

Kim, Chun Gyeong et al., "IoT-based Core Smart Devices and Application S/W for Smart Factory", Final Report on the Research and Operation Fund Support Project of the Korea Electric Research Institute (Jul. 13, 2019), URL (https://doi.org/10.23000/TRKO201900003687).

* cited by examiner

800

900

(Cutting state)

(Standby state)

(Cutting state)

A: Positioning (rapid movement)
G00

B: Linear cutting
(linear interpolation)
G01

C1: Contour cutting
(circular interpolation)
G02

C2: Contour cutting
(circular interpolation)
G03

(Cutting state)

SYSTEM AND METHOD FOR MONITORING MACHINE TOOL USING DIGITAL TWIN

CROSS-REFERENCE TO RELATED APPLICATIONS

The present application is a continuation of International Patent Application No. PCT/KR2023/002815, filed on Feb. 28, 2023, which is based upon and claims the benefit of priority to Korean Patent Application Nos. 10-2022-0026682 and 10-2022-0103035 filed on Mar. 2, 2022 and Aug. 18, 2022. The disclosures of the above-listed applications are hereby incorporated by reference herein in their entirety.

BACKGROUND

1. Technical Field

The present disclosure relates to a system and method for monitoring a machine tool using a digital twin. More specifically, the present disclosure relates to a system and method that allows a user to easily access operation information of a machine tool using a server-based service platform and a digital twin.

2. Description of Related Art

A machine tool is referred to as a machine used to process metallic or non-metallic material (hereinafter referred to as a base material) into a shape and a dimension using an appropriate tool or to add more precise processing using various cutting or non-cutting processing methods.

Automation and numerical control of a machine tool are rapidly progressing throughout the industry to improve productivity and produce various processed products. In addition, the computer numerical control has been applied, and accordingly, a wide range of demand in industrial fields is created.

Meanwhile, as a smart factory has become a major issue for manufacturers, companies and process-related data are being digitized or online through the introduction of the system such as enterprise resource planning (ERP), manufacturing execution system (MES), supply chain management (SCM), warehouse management system (WMS), and product life cycle management (PLM).

Accordingly, researches are continuing to efficiently connect automation equipment such as machine tools with a system for the smart factory, and a solution for monitoring machine tools is being developed. However, currently, in most cases, data about a machine tool are received through a sensor, a tablet, a barcode, or RFID attached to the outside of the machine tool rather than receiving data directly from the machine tool, and the information needed for the solution is collected piecemeal.

SUMMARY

An embodiment disclosed in the present disclosure is to provide a method for a user to easily access data about a necessary machine tool by providing a digital twin of a physical machine tool so that the machine tool can be more easily accessed.

Technical problems of the inventive concept are not limited to the technical problems mentioned above, and other technical problems not mentioned will be clearly understood by those skilled in the art from the following description.

In an aspect, a system for monitoring a machine tool that communicates with an edge device using a digital twin is disclosed, wherein the edge device may be configured to: request machining data for an operation of the machine tool in real time using a query different for each detailed process existing within one machining process to the machine tool, and receive data of a preset data format in response to corresponding machining data among the machining data from the machine tool, and wherein the machine tool may be configured to: generate machining data including at least one of cutting data, movement data, or standby data for an operation corresponding to the query, and transmit the machining data to the edge device in real time.

Furthermore, based on the machining data being the cutting data, the edge device may be configured to receive only partial data of the preset data format at a faster cycle than a preset cycle in response to the cutting data.

Furthermore, based on the machining data being the standby data, the edge device may be configured to receive all data of the preset data format at a slower cycle than the preset cycle in response to the standby data.

Furthermore, based on a request of subscription related to cutting from the machine tool by the edge device, the machine tool may be configured to: select at least one specific machining data corresponding to a cutting mode related to the cutting during the current process, transmit only partial data of the preset data format at a faster cycle than a preset cycle in response to the selected specific machining data to the edge device to subscribe to the selected specific machining data.

Furthermore, the edge device may be configured to: receive an NC code, which is currently executing, from the machine tool, based on the received NC code, which is currently executing, determine whether the current process is in a cutting state, a moving state, or a standby state, and based on the current process being in the cutting state, receive only partial data of the preset data format at a faster cycle than a preset cycle in response to the cutting state.

Furthermore, the edge device may be configured to: further set at least one of a processing time, a processing cycle, or a processing duration according to the operating state of the machine tool.

Furthermore, the edge device may include a data transmitter, the data transmitter may be configured to: connect to a unidirectional IP network from the edge device with a specific IP (Internet Protocol) set to a server, block an access from other external devices to the edge device with the specific IP, receive the machining data from a message queue, and transmit the machining data to the server using the unidirectional IP network.

Furthermore, in another aspect, a method for monitoring a machine tool that communicates with an edge device using a digital twin may include requesting, by the edge device, machining data for an operation of the machine tool in real time using a query different for each detailed process existing within one machining process to the machine tool; generating, by the machine tool, machining data including at least one of cutting data, movement data, or standby data for an operation corresponding to the query; transmitting, by the machine tool, the machining data to the edge device in real time; and receiving, by the edge device, data of a preset data format in response to corresponding machining data among the machining data from the machine tool.

Furthermore, receiving the data may include: based on the machining data being the cutting data, receiving only partial data of the preset data format at a faster cycle than a preset cycle in response to the cutting data.

Furthermore, receiving the data may include: based on the machining data being the standby data, receiving all data of the preset data format at a slower cycle than the preset cycle in response to the standby data.

Furthermore, transmitting the machining data may include: requesting, by the edge device, subscription related to cutting from the machine tool by the edge device, selecting, by the machining tool, at least one specific machining data corresponding to a cutting mode related to the cutting during the current process, and transmitting, by the machining tool, only partial data of the preset data format at a faster cycle than a preset cycle in response to the selected specific machining data to the edge device to subscribe to the selected specific machining data.

Furthermore, receiving the data may include: based on an NC code, which is currently executing, received from the machining tool, determining, by the edge device, whether the current process is in a cutting state, a moving state, or a standby state, and based on the current process being in the cutting state, receiving, by the edge device, only partial data of the preset data format at a faster cycle than a preset cycle in response to the cutting state.

Furthermore, the method may further include setting, by the edge device, at least one of a processing time, a processing cycle, or a processing duration according to the operating state of the machine tool.

Furthermore, the method may further include connecting, by a data transmitter in the edge device, to a unidirectional IP network from the edge device with a specific IP (Internet Protocol) set to a server, blocking, by the data transmitter, an access from other external devices to the edge device with the specific IP, and receive, by the data transmitter, the machining data from a message queue, and transmit the machining data to the server using the unidirectional IP network.

In addition, another method, another system, and a computer-readable recording medium recording a computer program for executing the method for implementing the present disclosure may be further provided.

Other specific details of the present disclosure are included in the detailed description and drawings.

DETAILED DESCRIPTION

Figure 1:
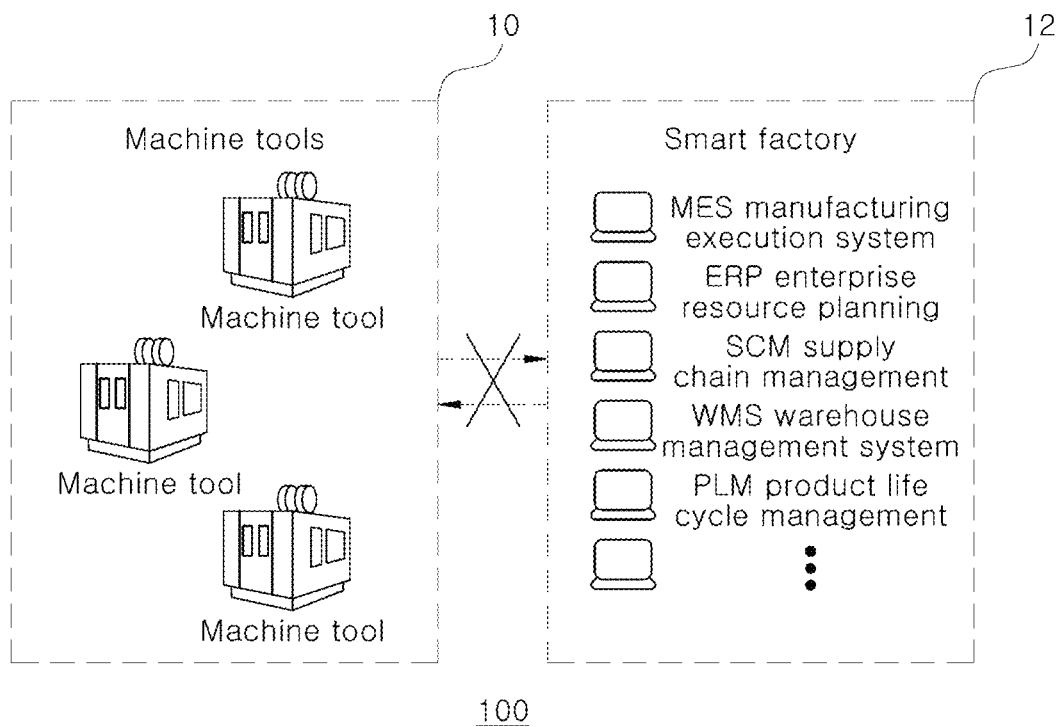
FIG. 1 schematically illustrates the relationship between machine tools and a smart factory according to a comparative example.

In the drawings, the same reference numeral refers to the same element. This disclosure does not describe all elements of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one element, or a unit, a module, a member, or a block may include a plurality of elements.

Throughout this specification, when a part is referred to as being "connected" to another part, this includes "direct connection" and "indirect connection", and the indirect connection may include connection via a wireless communication network.

Furthermore, when a certain part "includes" a certain element, other elements are not excluded unless explicitly described otherwise, and other elements may in fact be included.

In the entire specification of the present disclosure, when any member is located "on" another member, this includes a case in which still another member is present between both members as well as a case in which one member is in contact with another member.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

Hereinafter, operation principles and embodiments of the present disclosure will be described with reference to the accompanying drawings.

In this specification, a 'machine tool' refers to a machine that makes or processes various machines, and an object processed by the machine tool may be defined as a 'workpiece'.

In this specification, a 'user' may be implemented as a computer or mobile terminal that may access a digital twin through a network. Here, the computer may include, for example, a notebook, a desktop, a laptop, a tablet PC, a slate PC, and the like equipped with a web browser, and the mobile terminal may be a wireless communication device that guarantees portability and mobility, and may include, for example, all types of handheld-based wireless communication devices such as Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, CDMA (Code Division Multiple Access)-2000, W-CDMA (W-Code Division Multiple Access), WiBro (Wireless Broadband Internet) terminal, smart phone, and the like and wearable devices such as a watch, a ring, a bracelet, an ankle, a necklace, glasses, a contact lens, or a head-mounted-device (HMD).

The 'Digital Twin' refers to a digital twin that has the same information as a physical facility (e.g., a machine tool). As an example, a machine tool may be viewed as an industrial Internet of Things (IIoT) and digitized to create a digital twin that may be accessed online.

FIG. 1 schematically illustrates the relationship between machine tools and a smart factory according to a comparative example.

As an example, a system 100 shown in FIG. 1 includes a plurality of machine tools 10 and a smart factory 12.

FIG. 1 shows the case in which the plurality of machine tools 10 and the automation equipment of the plurality of machine tools 10 are not smoothly connected to the smart factory 12 (or smart factory solution).

In this specification, the smart factory 12 or the smart factory solution may be an example of the 'user'. The smart factory solution may be defined as a system that collects and analyzes data from processes such as manufacturing, production, and sales, and manages the production of products based on this. As the smart factory 12 become a major issue in the manufacturing industry, systems such as manufacturing execution system (MES), enterprise resource planning (ERP) or supply chain management (SCM) system, warehouse management system (WMS), and product lifecycle management (PLM) are introduced, and manufacturers' manufacturing-related data are being digitized or online.

In order to use the smart factory solution of the smart factory 12, monitoring information of the plurality of machine tools 10 needs to be smoothly transmitted to the smart factory 12, and according to the system 100 of the comparative example, it is shown that the connection or communication between the machine tools 10 and the smart factory 12 is not smooth.

As an example, according to the system 100 of the comparative example, motion data of the machine tools 10 may be transmitted and received through sensors, tablets, barcodes, or RFID (Radio-Frequency Identification) attached to the outside of the plurality of machine tools 10, rather than motion data are directly transmitted from the plurality of machine tools 10, and the motion data may be information needed piecemeal in the smart factory solution introduced in the smart factory 12.

Additionally, each of the plurality of machine tools 10 may include a controller (not shown). The controllers (not shown) included in the plurality of machine tools 10 may be CNC (Computer Numerical Control) controllers. As an example, each of the CNC controllers included in the plurality of machine tools 10 may provide different protocols or different communication schemes.

Figure 2:
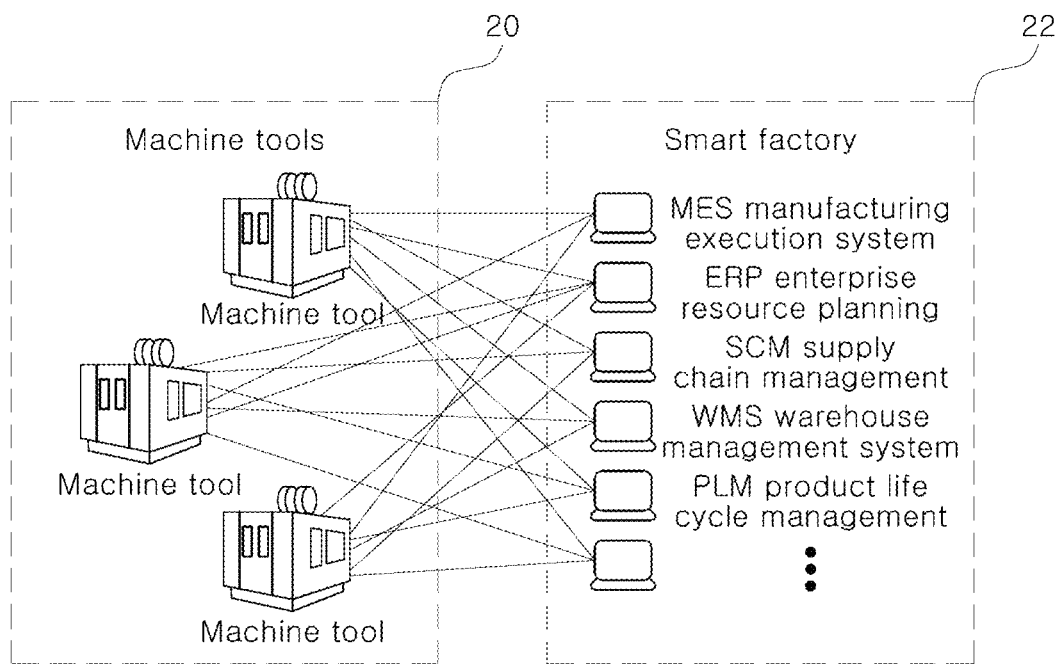
FIG. 2 schematically illustrates the relationship between machine tools and a user according to an embodiment of the present disclosure.

FIG. 2 schematically illustrates the relationship between machine tools and a user according to an embodiment of the present disclosure.

As an example, a system 200 shown in FIG. 2 includes a plurality of machine tools 20 and a smart factory 22.

FIG. 2 shows the case in which the plurality of machine tools 20 and the automation equipment of the plurality of machine tools 20 are smoothly connected to the smart factory 22 (or smart factory solution).

According to the system 200 shown in FIG. 2, machining data of each of the plurality of machine tools 20 may be easily accessed from various smart factory solutions of the smart factory 22. In one embodiment, the system 200 of FIG. 2 uses a digital twin to easily access the machining data of each of the plurality of machine tools 20 without implementing all different communication schemes, which are different for a type, a brand, a type of CNC controller, and a version of each of the plurality of machine tools 20.

As an example, the machining data of the machine tool may include a machine tool list, type and version information of the controller mounted on the machine tool, and the type and number of axes of the machine tool. In addition, the machining data of the machine tool may include the operating status of the machine tool (e.g., running, stopped, standby, power off), the tool path of the machine tool (e.g., the position of each axis, load value, feed value, depth of cut), and current processing information (machining program, machining LOT, number of machining to date, expected machining completion time, and expected LOT completion time).

As another example, the machining data may include information about the machine tool at a specific point in time in the past. As an example, the machining data may include operating status, toolpath, machining information, machining program and usage history at the time, machining and production history for a certain cycle in the past, calibration and replacement history, and machine warning alarm and message history.

Figure 3:
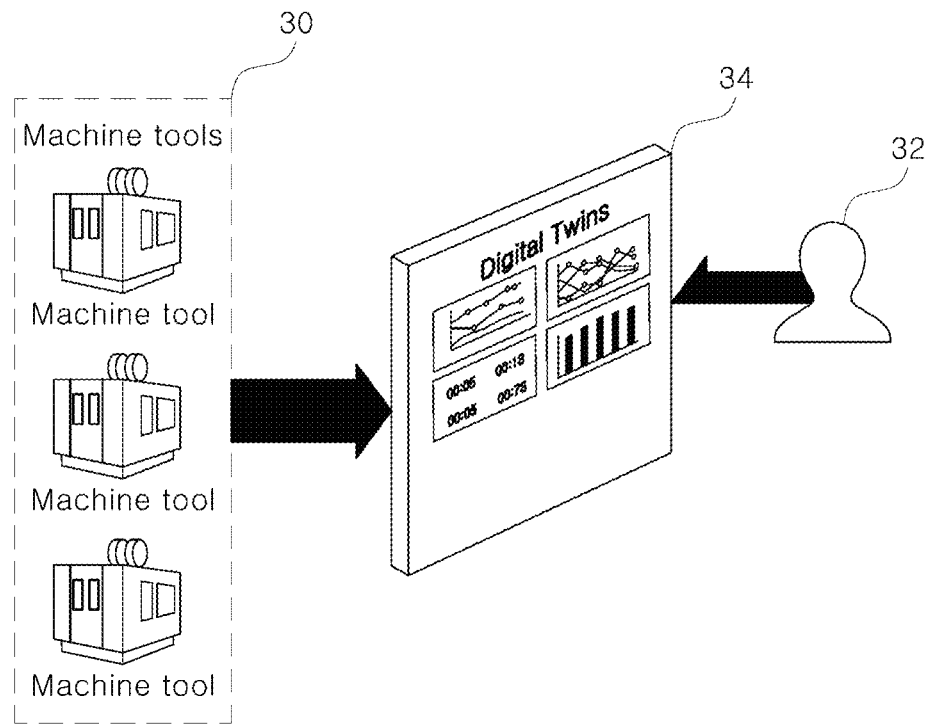
FIGS. 3 and 4 schematically illustrate the relationship between machine tools including a digital twin and a user according to an embodiment of the present disclosure.
Figure 4:
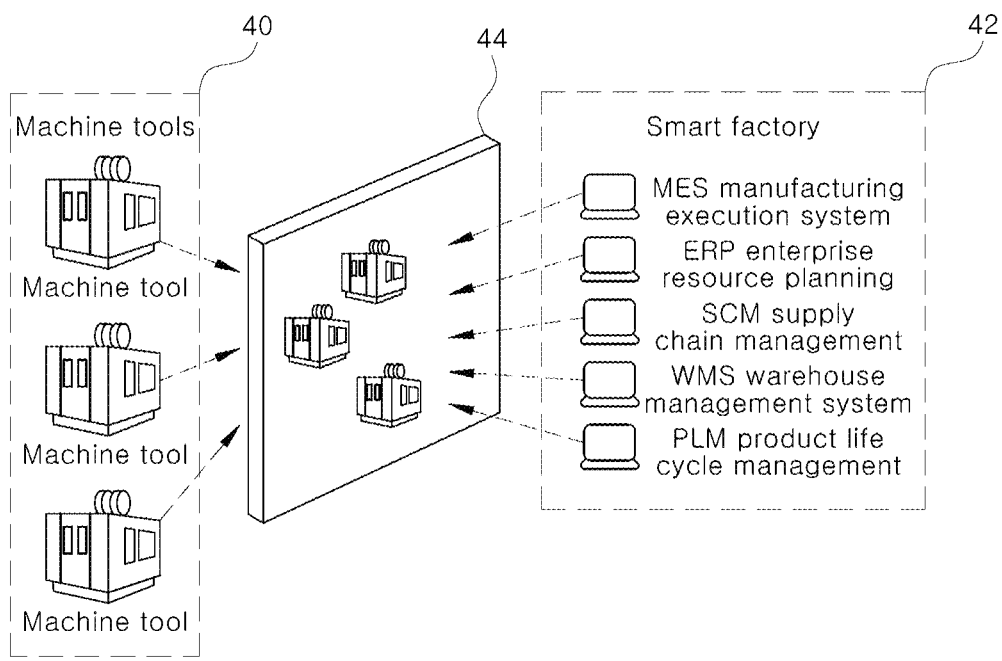

FIGS. 3 and 4 schematically illustrate the relationship between machine tools including a digital twin and a user according to an embodiment of the present disclosure.

Referring to FIGS. 3 and 4, the machine tools 30 of FIG. 3 may correspond to the machine tools 40 of FIG. 4, the digital twins 34 of FIG. 3 may correspond to the digital twin 44 of FIG. 4, and the user 32 of FIG. 3 may correspond to the smart factory solutions (e.g., MES, ERP, SCM, WMS or PLM) of the smart factory 42 of FIG. 4.

As an example, the user 32 may access the digital twin 34 to identify the operating status, the production status, and the like of the machine tools. The monitoring system for the machine tools 30 using the digital twin 44 may receive, through a server, a large number of data generated at an industrial site that produce machine tools or workpieces using machine tools, and manage a wide range of data in accordance with for the system situation appropriately. At this time, the server may include a cloud-based server. That is, using the digital twin 32 of FIG. 3, data from machine tools 30 may be collected and used using only an Internet connection without installing a sensor, a barcode, or other devices.

Referring to FIG. 4, the manufacturing execution system (MES) of the smart factory 42 may collect machining data (e.g., processing program, processing LOT, number of processing to date, expected processing completion time, or expected LOT completion time) using the digital twin that serves as middleware to manage the production history of the workpiece.

As another example, the product life cycle management (PLM) of the smart factory 42 may collect machining data (e.g., calibration and replacement history of the machine tool, machine tool warning alarm and message history) using the digital twin that serves as middleware to manage the life of the machine tools 40.

In the smart factory solutions (e.g., MES, ERP, SCM, WMS, or PLM) of the smart factory 42, without having to implement an interface for each different machine tool, the information for the machine tools 40 may be collected according to the purpose of each smart factory solution using the digital twin 44.

Figure 5:
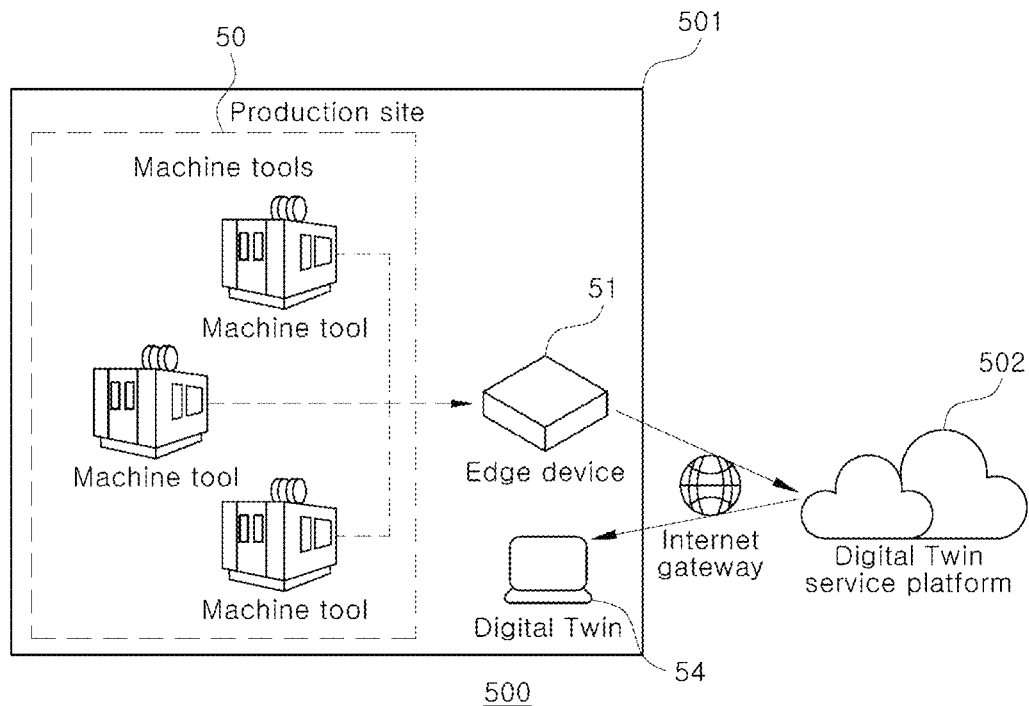
FIG. 5 illustrates the structure of a communication system including machine tools and a digital twin service platform according to an embodiment of the present disclosure.

FIG. 5 illustrates the structure of a communication system including machine tools and a digital twin service platform according to an embodiment of the present disclosure.

A communication system 500 shown in FIG. 5 may include a production site 501 including machine tools 50, an edge device 51, and a digital twin 54 and a digital twin service platform 502. The wireless communication network used for communication between the production site 501 and the digital twin service platform 502 may be a local area network or a mobile communication network. The example may include at least one of wired networks such as Local Area Networks (LANs), Wide Area Networks (WANs), Metropolitan Area Networks (MANs), and Integrated Service Digital Networks (ISDNs), wireless local area networks (wireless LANs), and satellite communications, but not limited thereto.

An Internet gateway may be used for communication between the production site 501 and the digital twin service platform 502. The Internet gateway may be a computing device that connects the machine tool-dedicated communication network of the machine tools 50 and the digital twin service platform network provided by the server.

The machine tools 50 may generate machining data in real time when making or processing various machines. The machining data may be any data that may be extracted from the machine tools, and all data ranging from several to hundreds of times per second may be stored in big data. The big data may be transmitted, stored, or searched using a big data storage of the server. For example, by loading the machining data from a specific point in the past, the machine tool operation situation at a specific point in the past may be reproduced, and these data may be used as back data for machine learning.

The edge device 51 may communicate with the plurality of machine tools 50. The edge device may refer to a device that uses an edge computing method performed at or close to the location of a user or data. The edge device 51 may be implemented using a program that plays an edge role in the hardware of an industrial PC or mini PC. The machine tool monitoring method according to an embodiment of the present disclosure may be performed within the range of machine tool available to one edge device 51 by checking the CPU load value of the edge device 51. When the machining data of the machine tools 50 are transmitted from the edge device 51 to the digital twin service platform 502, the machining data may be transmitted using encrypted communication. For example, there may be a plurality of edge devices 51.

According to an embodiment of the present disclosure, a method for monitoring a machine tool using the digital twin 54 may be implemented using the digital twin service platform 502. The digital twin service platform 502 may be a service platform provided by the server, and if a required authentication or security procedure is passed, the authenticated user may obtain machining data of the machine tools 50 using the digital twin 54. As an example, the digital twin 54 may analyze the machining data of the machine tools 50 based on artificial intelligence (AI). As an example, the digital twin service platform 502 may predict the operation time or failure time of the machine tools 50 using the result analyzed by the digital twin 54.

The digital twin service platform 502 may be Saas (Software-as-a-Service), which means 'software as a service'. SaaS refers to providing complete software as a service, and the example may include email and YouTube that users may use directly online. SaaS may be structured in such a way that software and related data are centrally hosted and a user accesses them through a client such as a web browser. The user using the digital twin service platform 502 has almost no initial investment cost and may use it by placing the edge device 51 and connecting it to the machine tools 50 with a LAN cable. When the number of machine tools 50 increases, the digital twin service platform 502 may be used without additional customization as long as it is connected to a network with a new machine tool.

Figure 6:
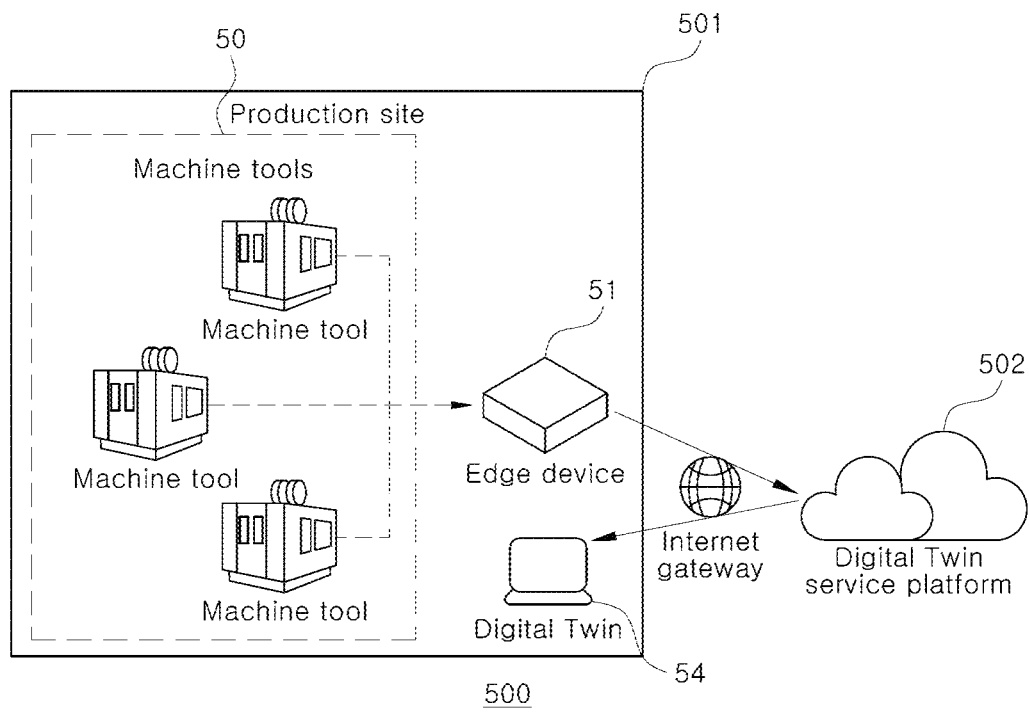
FIG. 6 illustrates a structure of a part of a system for monitoring a machine tool using a digital twin according to an embodiment of the present disclosure.

FIG. 6 illustrates a structure of a part of a system for monitoring a machine tool using a digital twin according to an embodiment of the present disclosure.

Referring to FIG. 6, a system for monitoring a machine tool using a digital twin may include a machine tool 60, an edge device 61, and a server 63.

The machine tool 60 may include a controller 2, which may be a CNC controller. The controller 2 may control the overall operation of the machine tool 60 through a dedicated protocol, and may generate machining data for the operation of the machine tool. It may be implemented as a memory (not shown) that stores data for an algorithm for controlling the operation of components in the machine tool 60 or a program that reproduces the algorithm, and a processor not shown that performs the operation using the data stored in the memory. At this time, the memory and the processor may be implemented as separate chips, respectively. Alternatively, the memory and the processor may be implemented as a single chip.

For example, after the authentication procedure between the edge device 61 and the machine tool 60 is performed, A data collector 4_1, 4_2, or 4_3 of the edge device 61 may request in real time the machining data on the operation of the authenticated machine tool from the machine tool 60 (or the controller 2 of the machine tool) through a query. The query may include information on a priority or cycle of the machining data.

The data collector 4_1, 4_2, or 4_3 of the edge device 61 may set at least one of a processing time, a processing cycle, or a processing duration according to the operation state of the machine tool 60 (for example, cutting, high-speed movement or standby), and accordingly, request the machining data on the operation of the machine tool in real time. In addition, the data collector 4_1, 4_2, or 4_3 of the edge device 61 may request the machining data on the operation of the machine tool in real time according to the priority or call sequence.

The edge device 61 may efficiently collect only data appropriate to the state of the machine tool 60, and accordingly, maximize the amount of necessary data that may be extracted per unit time and reduce the load on the controller 2 of the machine tool 60, and thus, real-time data collection and response speed may be guaranteed, so that the performance of the edge device 61 may be enhanced.

FIG. 6 shows the data collectors 4_1, 4_2, and 4_3 including three data collectors as an example, but the present disclosure is not limited thereto, and the edge device 61 may be configured to include one or more data collectors. For example, the data collectors 4_1, 4_2, and 4_3 of the edge device 61 may be configured with two or more data collectors to prevent real-time data loss, and when the main data collector 4_1 is in operation, the sub data collector 4_2 may maintain a standby state, and when the main data collector 4_1 is not in operation, the sub data collector 4_2 may operate as a replacement for the main data collector 4_1.

The edge device 61 may continuously, in real time, and without missing any machining data from the machine tool 60 (or the controller 2). The machining data may only mean the value at the moment of access, and the data value at the time of non-access may not be stored as volatile.

The message queue 6 may be a message queue based on an HDD or an SDD. The message queue 6 may queue machining data on the operation of the machine tool 60 received from one of the data collectors 4_1, 4_2, and 4_3 in the event that the machining data on the operation of the machine tool 60 may not be transmitted to the server 63 due to a long-term Internet connection disconnection, thereby minimizing data loss.

The edge device 61 may include, for example, at least one of a short-range communication module, a wired communication module, or a wireless communication module.

The short-range communication module may include various short-range communication modules that transmit and receive signals using a wireless communication network in a short range, such as a Bluetooth module, an infrared communication module, an RFID (Radio Frequency Identification) communication module, a WLAN (Wireless Local Access Network) communication module, an NFC communication module, and a Zigbee communication module.

The wired communication module may include various wired communication modules such as a Local Area Network (LAN) module, a Wide Area Network (WAN) module, or a Value Added Network (VAN) module, as well as various cable communication modules such as a Universal Serial Bus (USB), a High Definition Multimedia Interface (HDMI), a Digital Visual Interface (DVI), RS-232 (recommended standard232), power line communication, or a plain old telephone service (POTS).

The wireless communication module may include a wireless communication module that supports various wireless communication methods such as a WiFi module, a Wireless broadband module, and a GSM (global System for Mobile Communication), CDMA (Code Division Multiple Access), WCDMA (Wideband Code Division Multiple Access), UMTS (universal mobile telecommunications system), TDMA (Time Division Multiple Access), and LTE (Long Term Evolution).

The data transmitter 8 may be included or connected to one of a short-range communication module, a wired communication module, and a wireless communication module, and may be implemented as one of a short-range communication module, a wired communication module, and a wireless communication module. The data transmitter 8 may receive machining data from a message queue 6 and transmit the machining data to the server 63. The data transmitter 8 may allow network access only in one direction from the edge device 61 to the server 63, and may block the possibility of hacking of the edge device 61 by setting a separate IP band. In addition, the data transmitter 8 may compress, encrypt, and bundle-transmit machining data, and may thus efficiently use network resources.

The server 63 may provide an IT environment that abstracts, pools, and shares scalable resources throughout the network, and may include, for example, a cloud server, which is a virtualized server on the Internet.

The physical operation information of the machine tool, that is, the machining data, may be reflected from the server 63 to the digital twin. For example, the digital twin may provide a web-friendly RESTful protocol, and thus, a user such as smart factory solutions may easily access the machining data of the machine tool.

At least one component may be added or deleted in response to the performance of each component shown in FIG. 6. In addition, it will be easily understood by those skilled in the art that the mutual positions of the components may be changed in response to the performance or structure of the system.

Meanwhile, each component shown in FIG. 6 means software and/or hardware components such as a Field Programmable Gate Array (FPGA) and an Application Specific Integrated Circuit (ASIC).

Figure 7:
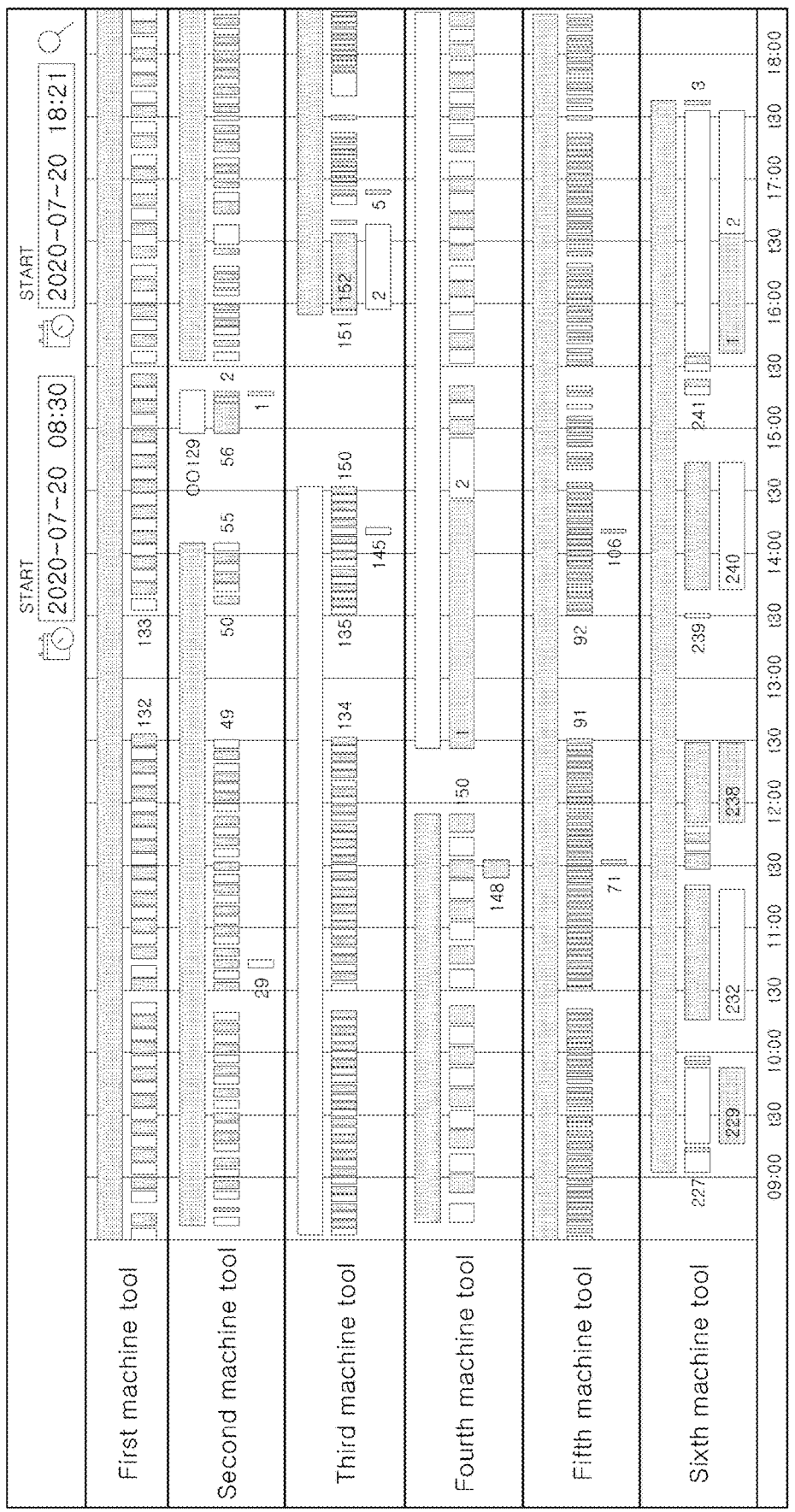
FIG. 7 illustrates an example of a display screen that analyzes machining data of each machine tool generated according to an embodiment of the present disclosure in a time-series manner according to the processing status.

FIG. 7 illustrates an example of a display screen that analyzes machining data of each machine tool generated according to an embodiment of the present disclosure in a time-series manner according to the processing status.

For example, FIG. 7 shows a display screen 700 that searches and analyzes processing LOT and LOT processing time, a single-item processing time, a preparation replacement time, a setting time, and the like for each machine tool in a time-series manner from about 9:00 AM to about 6:00 PM (see horizontal axis).

Even in the case that workers at a production site do not separately write work logs or production details, the production volume, non-operating time, equipment overall efficiency, and the like for a certain cycle of time may be automatically measured. The machining data of each of the first to sixth machine tools may be transmitted from the machine tool (60, FIG. 6) to the digital twin through the edge device 61 as described above in FIG. 6, and may be reflected in real time on the display screen 700 from the digital twin.

Figure 8:
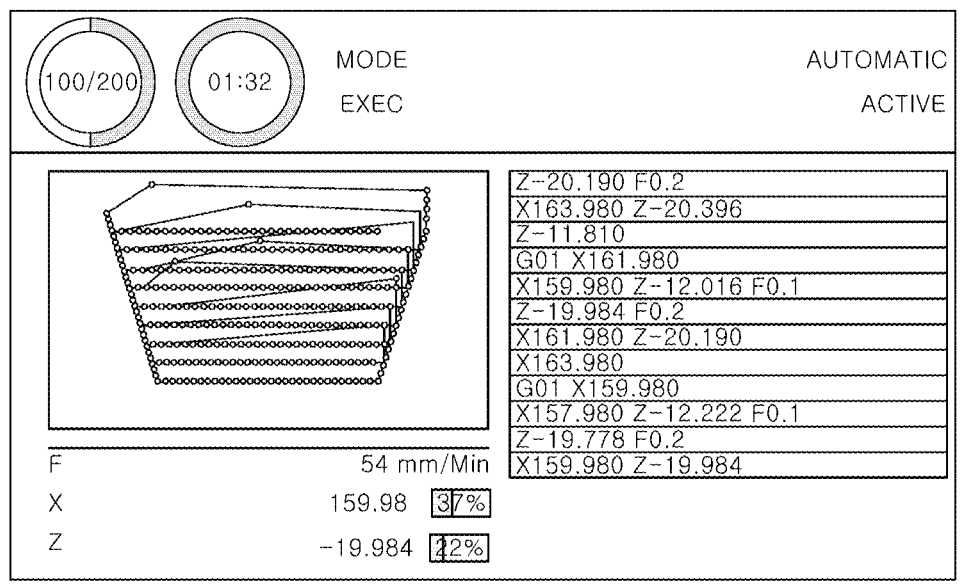
FIG. 8 illustrates an example of a display screen showing the detailed processing status of the first machine tool of FIG. 7.

FIG. 8 illustrates an example of a display screen showing the detailed processing status of the first machine tool of FIG. 7.

According to a display screen 800 of FIG. 8, the machining data corresponding to the real-time operating status of a first machine tool may be retrieved from the digital twin, and the processing progress status, such as the processing tool path, the load value for each axis, and the feed value, may be displayed on the display screen 800. The tool path during or after actual processing may be checked through the display screen 800.

For example, through the display screen 800 of FIG. 8, the variation of the load value according to the tool path during processing within the same LOT may be checked, and abnormal wear or damage of the tool may be determined in advance.

Figure 9:
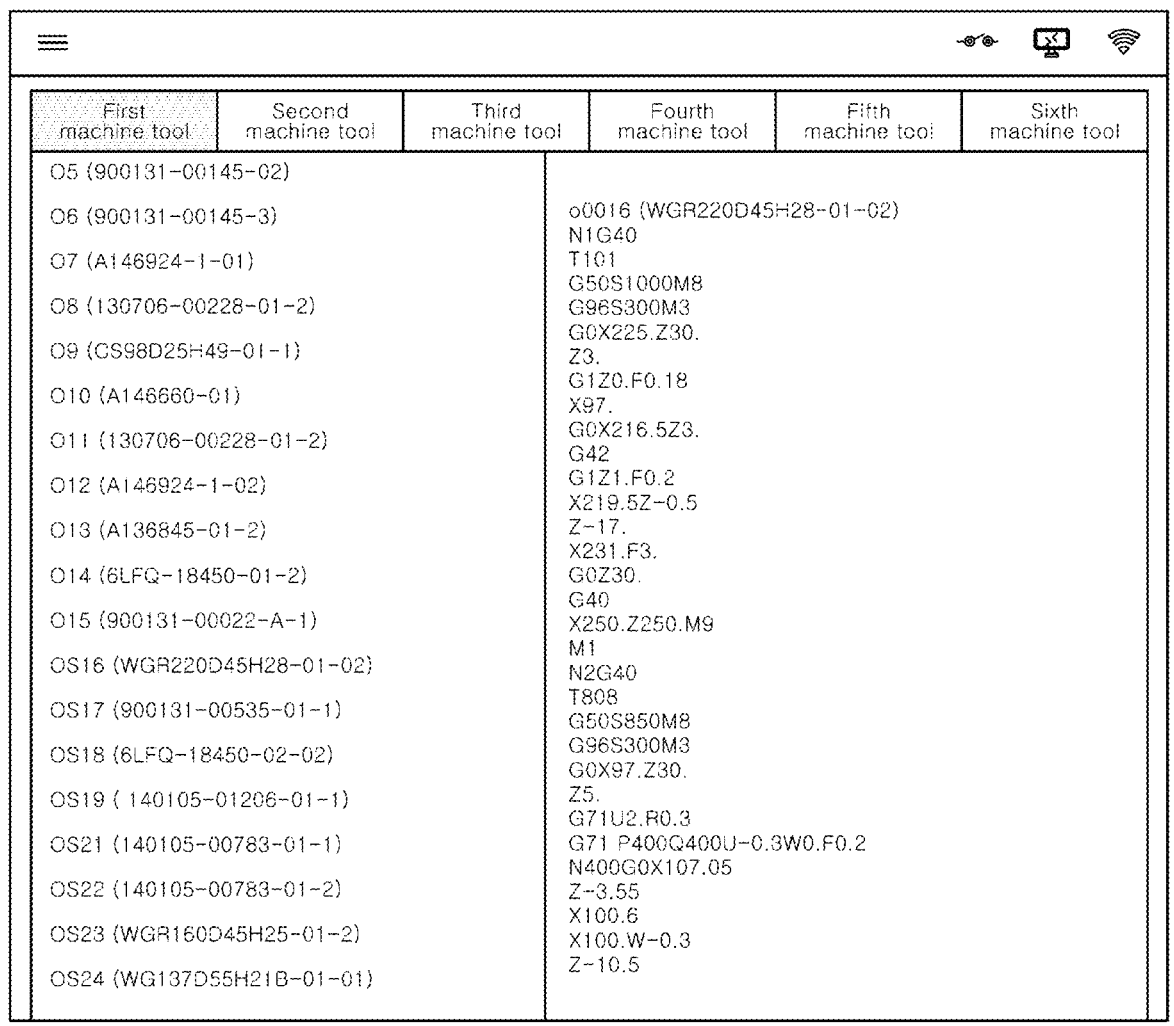
FIG. 9 illustrates an example of a program management screen of the first machine tool of FIG. 7.

FIG. 9 illustrates an example of a program management screen of the first machine tool of FIG. 7.

Referring to the management screen of FIG. 9, the processing program may be checked, downloaded, and uploaded for each machine tool. Different machining programs stored in each machine tool may be searched, downloaded, or uploaded from a single computer.

For example, the machining program of the first machine tool may compare the past machining history with the current machining history, and the reusability of the program may be increased by utilizing the past machining history that was previously written.

Referring to FIGS. 7 to 9, a smart factory may be implemented so that basic data for configuring the smart factory that is actually helpful in the production site (e.g., data including information such as whether LOT production has started and completed, whether single-item machining has started or stopped, etc.) is automatically generated from low-level machining data of the machine tool through various methods.

Figure 10:
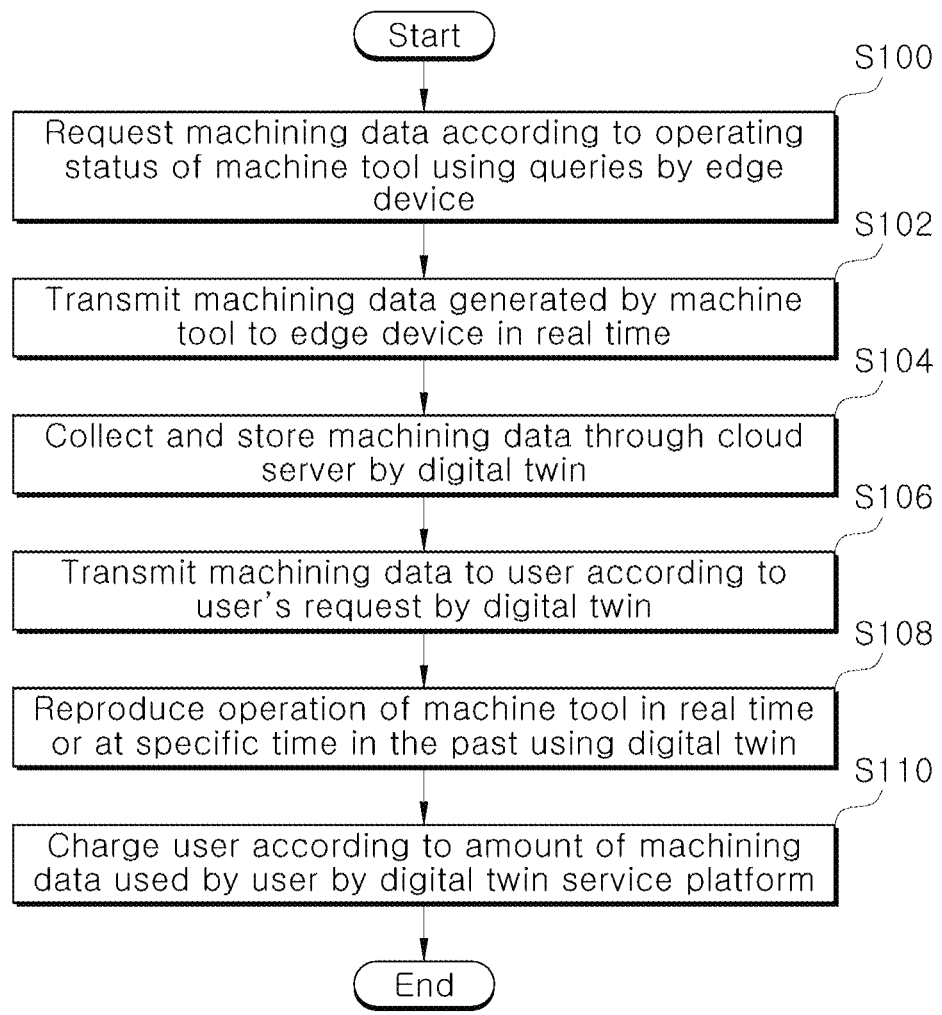
FIG. 10 is a flowchart illustrating a method for monitoring a machine tool using a digital twin according to an embodiment of the present disclosure.

FIG. 10 is a flowchart illustrating a method for monitoring a machine tool using a digital twin according to an embodiment of the present disclosure.

In step S100, the edge device may request machining data according to the operating status of the machine tool using different queries for each process. For example, the machine tool in operation may generate information for the tool path of the machine tool as machining data in real time.

In step S102, in response to the request of the edge device, the machine tool may transmit the generated machining data to the edge device in real time.

In step S104, the edge device may transmit the corresponding machining data through a server, and the digital twin may collect and store the machining data through the server.

In step S106, the digital twin may transmit the machining data to the user according to the user's request. The user may be, for example, a wireless communication device or a smart factory solution of the smart factory.

In step S108, the digital twin service platform may reproduce the operation of the machine tool in real time using the digital twin. Alternatively, the digital twin service platform may reproduce the operation of the machine tool at a specific time in the past using the digital twin. For example, the digital twin service platform may analyze and manage big data, and as described above in FIGS. 7 to 9, the information for the operation of the machine tool may be displayed on the display screen.

In step S110, the digital twin service platform may charge the user according to the amount of machining data used by the user.

Meanwhile, according to the present disclosure, when the edge device 61 receives the machining data from the machine tool 60, the edge device 61 may receive the machining data through various data transmission processes.

Figure 11:
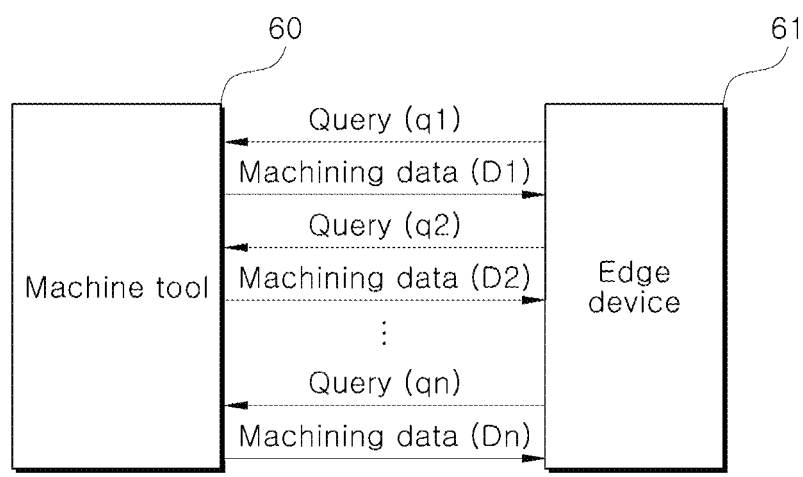
FIGS. 11 to 13 are diagrams illustrating examples of data transmission processes between the edge device and the machine tool according to an embodiment of the present disclosure.
Figure 12:
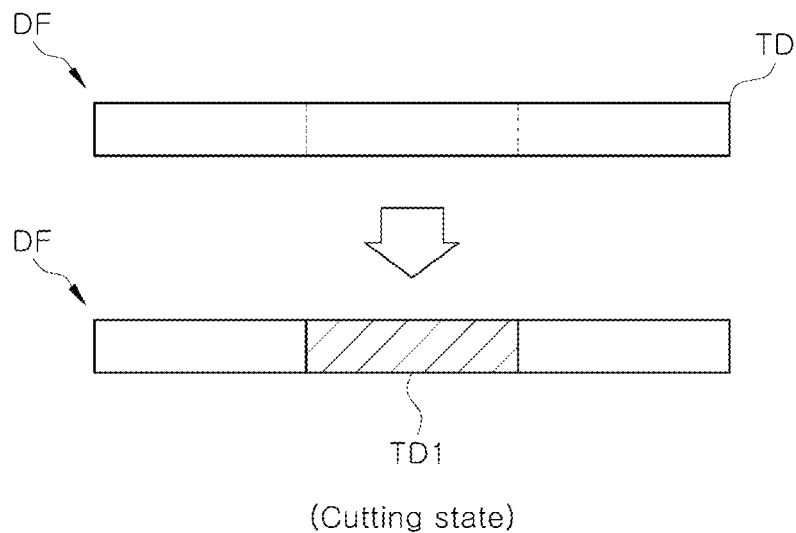
Figure 13:
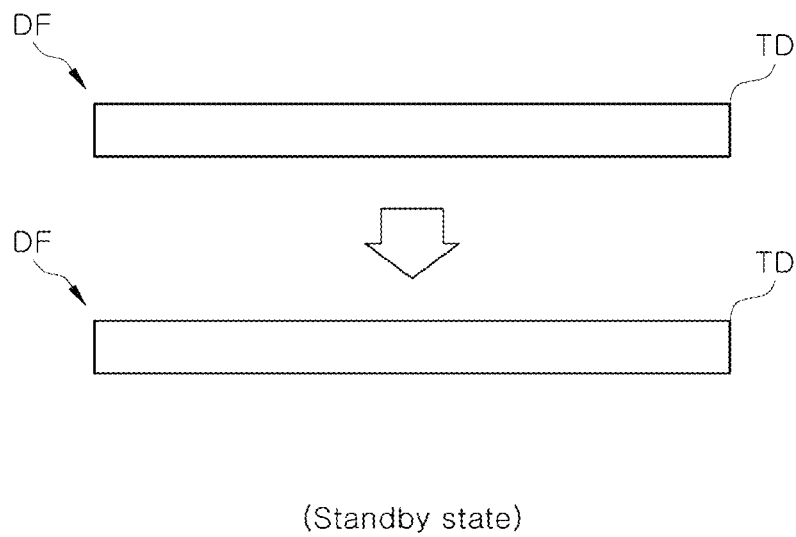

FIGS. 11 to 13 are diagrams illustrating examples of data transmission processes between the edge device and the machine tool according to an embodiment of the present disclosure.

Referring to FIG. 11, when the edge device 61 requests the machine tool 60 with different queries q1, q2, . . . , qn for each sub-process existing in one processing process and receives machining data D1, D2, . . . , Dn from the machine tool 60, the edge device 61 may receive data in a preset data format DF corresponding to the corresponding machining data among the machining data D1, D2, . . . , Dn at a preset cycle. At this time, the machining data D1, D2, . . . , Dn may include at least one of cutting data, movement data, or standby data regarding the operation of the machine tool 60 corresponding to the different queries q1, q2, . . . , qn for each process.

For example, as illustrated in FIG. 12, in the case that the machining data D1 are cutting data, the edge device 61 may receive only a portion of the data TD1 of the preset data format DF corresponding to the cutting data among the entire data TD of the data format DF from the machine tool 60 at a cycle faster than the preset cycle. At this time, the entire data TD of the data format DF may include at least one of cutting data, movement data, standby data, or load data, and the portion of the data TD1 of the data format DF may be cutting data, and the remaining data excluding the portion of the data TD1 of the data format DF may be at least one of movement data, standby data, or load data.

For another example, as illustrated in FIG. 13, in the case that the machining data D2 is standby data, the edge device 61 may receive the entire data TD of the preset data format DF corresponding to the standby data from the machine tool 60 at a slower cycle than the preset cycle. At this time, the entire data TD of the data format DF may include at least one of cutting data, movement data, standby data, or load data.

The data transmission process between the edge device 61 and the machine tool 60 according to the present disclosure may transmit only a part of the data TD1 of the data format DF to the edge device 61 at a faster cycle than the preset cycle in the case that the machining data D1 is cutting data, thereby shortening the transmission and reception time.

Figure 14:
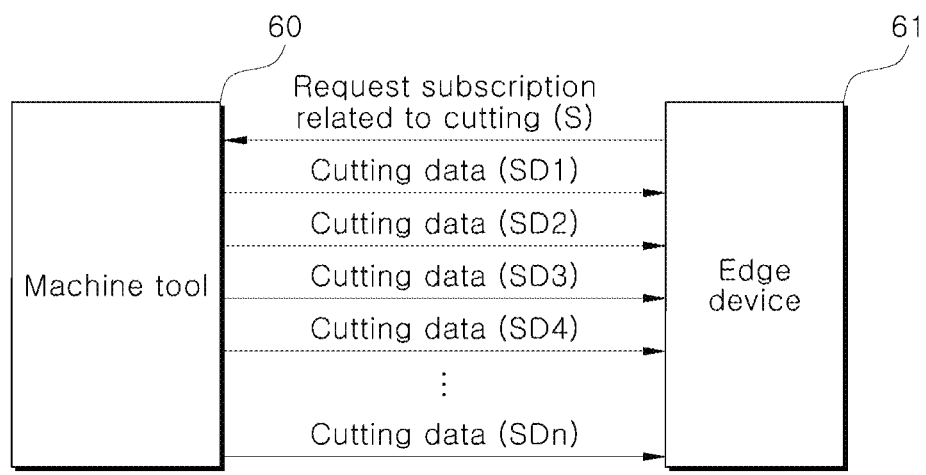
FIGS. 14 and 15 are diagrams illustrating another example of a data transmission process between an edge device and a machine tool according to an embodiment of the present disclosure.
Figure 15:
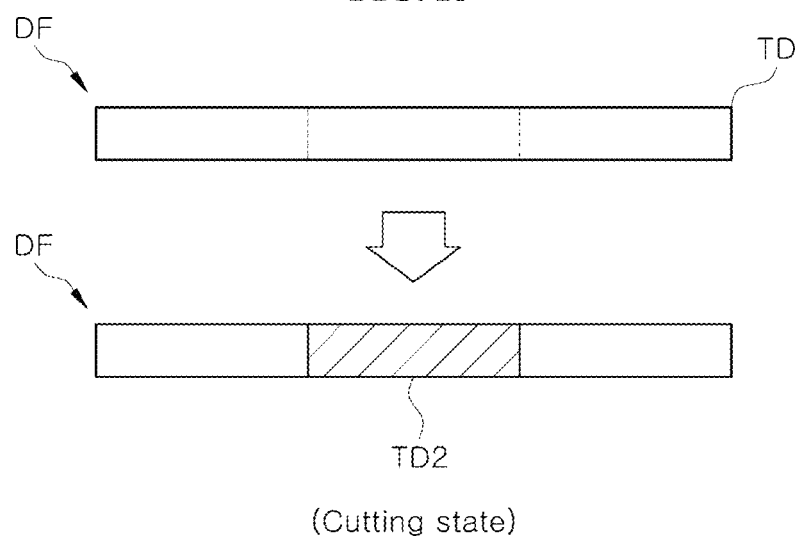

FIGS. 14 and 15 are diagrams illustrating another example of a data transmission process between an edge device and a machine tool according to an embodiment of the present disclosure.

Referring to FIG. 14 and FIG. 15, when the edge device 61 requests a subscription related to cutting(S) to the machine tool 60, the edge device 61 may receive cutting data SD1, SD2, . . . , SDn related to cutting from the machine tool 60 until the subscription command ends.

At this time, the machine tool 60 may select at least one specific machining data corresponding to a cutting mode related to cutting during the current process, and transmit only partial data TD2 of a preset data format DF corresponding to the selected specific machining data among all data TD of the data format DF to the edge device 61 at a cycle faster than the preset cycle so as to subscribe to the selected specific machining data. At this time, the entire data TD of the data format DF may include at least one of cutting data, movement data, standby data, or load data, and the partial data TD2 of the data format DF may be cutting data, and the remaining data excluding the partial data TD2 of the data format DF may be at least one of movement data, standby data, or load data.

In the data transmission process between the edge device 61 and the machine tool 60 according to the present disclosure, when the edge device 61 requests a subscription related to cutting to the machine tool 60, the machine tool 60 may select at least one specific machining data corresponding to a cutting mode related to cutting during the current process, and transmit only the partial data TD2 of the preset data format DF corresponding to the selected specific machining data among the entire data TD of the data format DF to the edge device 61 at a cycle faster than the preset cycle so as to subscribe to the selected specific machining data, thereby shortening the transmission and reception time.

Figure 16:
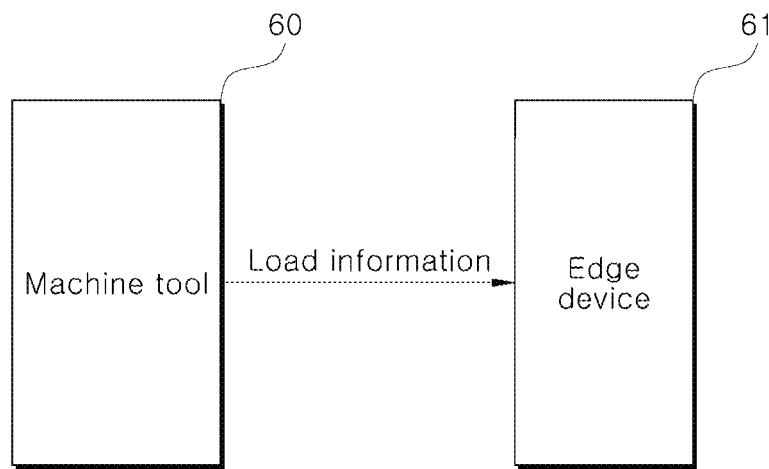
FIGS. 16, 17, and 30 are diagrams illustrating another example of a data transmission process between an edge device and a machine tool according to an embodiment of the present disclosure.
Figure 17:
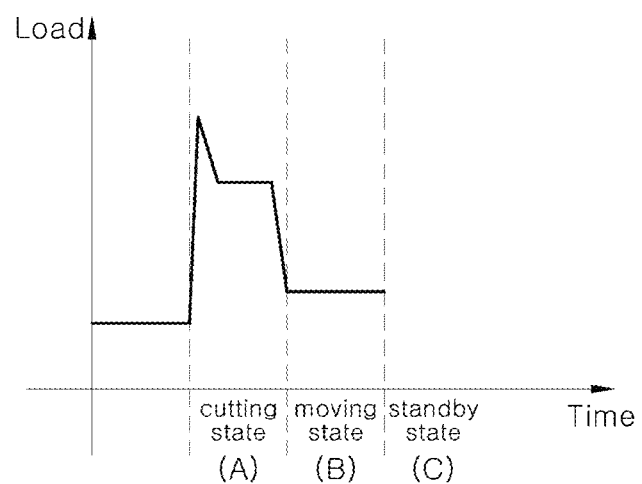
Figure 30:
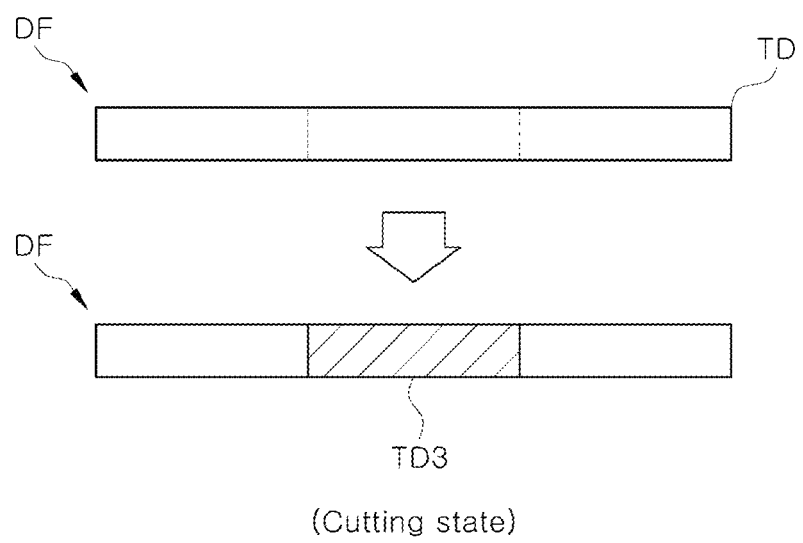

FIGS. 16, 17, and 30 are diagrams illustrating another example of a data transmission process between an edge device and a machine tool according to an embodiment of the present disclosure.

FIGS. 18 to 29 are diagrams for describing an NC code for the operation of a machine tool.

Referring to FIGS. 16 and 17, the edge device 61 may receive load information of the machine tool 60 from the machine tool 60 and may receive an NC code currently being executed from the machine tool 60. Here, the load information may include spindle load, load for each axis, and the like. At this time, the edge device 61 may determine whether the current process is a cutting state (A), a moving state (B), or a standby state (C) based on the received NC code currently being executed.

For example, the NC code may be a G code. The G code may include G00 code related to rapid positioning, G01 code related to linear interpolation, G02 code related to circular interpolation (CW), and G03 code related to circular interpolation (CCW). In addition, the G code may include G04 code related to dwell, G28 code related to automatic reference point return, G30 code related to second reference point return, G32 code related to thread cutting, G40 code related to tool radius compensation cancellation, G41 code related to tool edge R left compensation, G42 code related to tool edge R right compensation, and G50 code related to coordinate system setting and maximum speed specification. In addition, the G code may include G70 code related to a finishing cycle, G71 code related to an inner/outer roughing cycle, G72 code related to a cross-section cycle, G73 code related to a copying cycle, G74 code related to a cross-section grooving cycle, G75 code related to an inner/outer grooving cycle, and G76 code related to an automatic threading cycle. In addition, the G code may include G90 code related to an inner/outer cutting cycle, G92 code related to a threading cycle, and G94 code related to a cross-section cutting cycle. In addition, the G code may include G96 code related to a constant cutting speed control ON, and G97 code related to a constant cutting speed control OFF. In addition, the G code may include G98 code related to a feed per minute (milling) and G99 code related to a feed per revolution (lathe).

Figure 18:
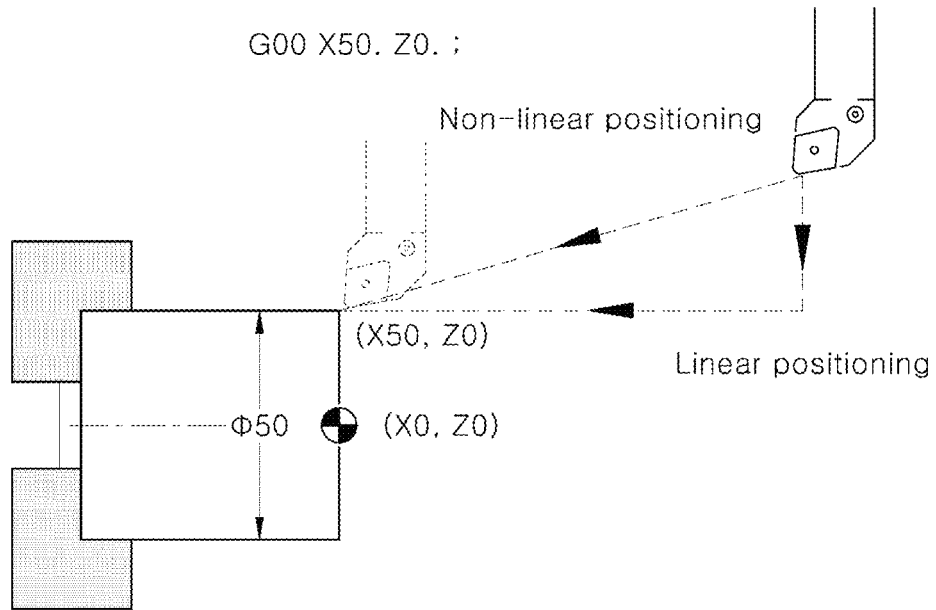
FIGS. 18 to 29 are diagrams for describing an NC code for the operation of a machine tool.

At this time, as shown in FIG. 18, G00 code related to rapid position selection is a code that instructs to move at the maximum movement speed to the specified coordinate, and may move rapidly toward the end point commanded in X(U), Z(W), and the tool may move rapidly at the maximum speed set in the parameter. It is mainly used when approaching the workpiece for the first time, returning after machining is completed, and changing tools, and the command method may be "G00 X(U)___Z(W)____".

Figure 19:
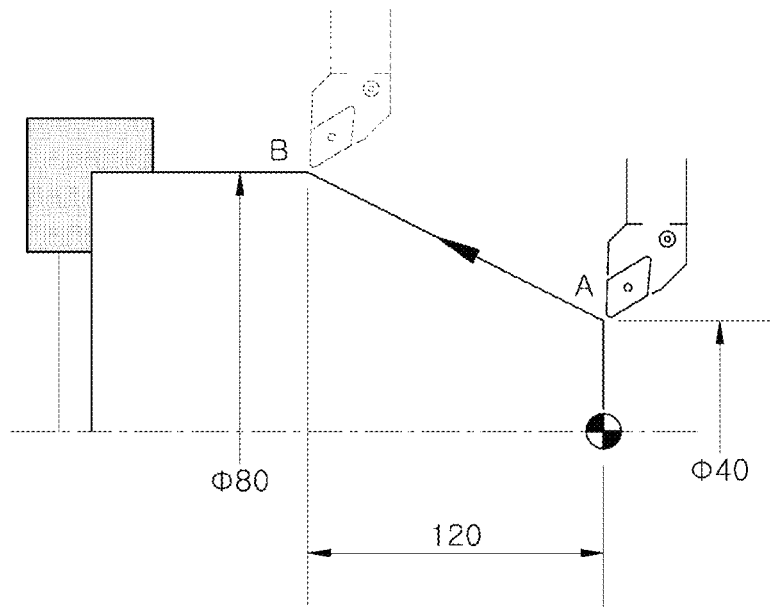

As shown in FIG. 19, G01 code related to linear interpolation (linear processing) is a code that instructs to move in a straight line to the specified coordinate, and may process in a straight line according to the speed of F to the commanded end point, and the command method may be "G01 X(U)___Z(W)___F___".

Figure 20:
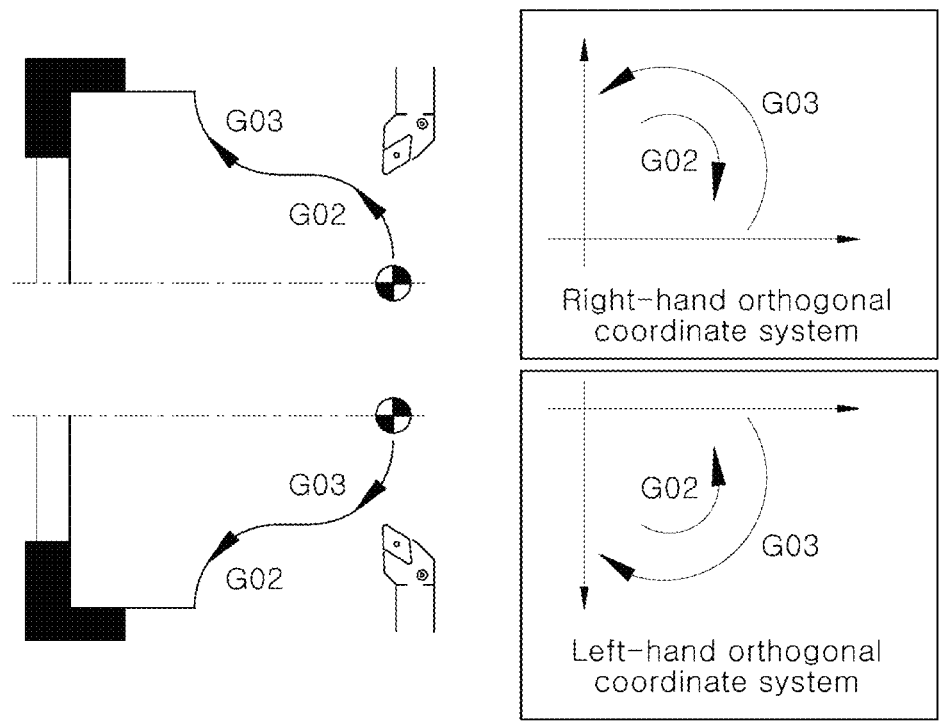

As shown in FIG. 20, G02 code related to clockwise circular interpolation is a code that instructs to move while drawing a circular pattern in the clockwise direction, and G03 code related to counterclockwise circular interpolation is a code that instructs to move while drawing a circular pattern in the counterclockwise direction, and may process an arc with a radius R from the commanded point to the end point.

Figure 21:
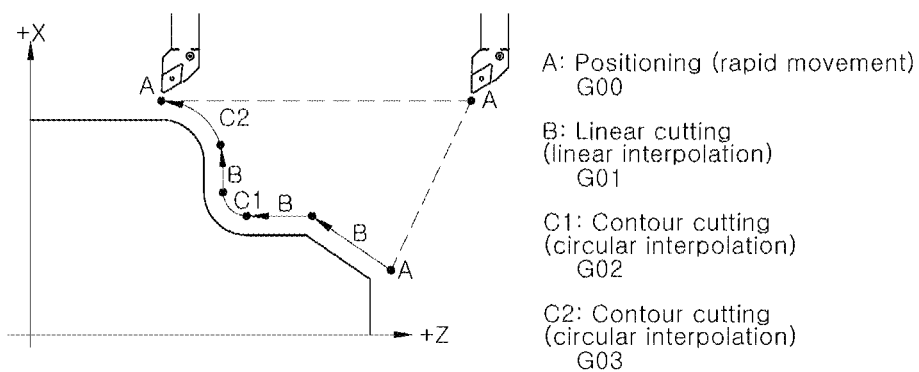

As shown in FIG. 21, G00 code related to rapid positioning, G01 code related to linear interpolation, G02 code related to circular interpolation (CW), and G03 code related to circular interpolation (CCW) may be codes for A: positioning (rapid feed) (G00 code), B: linear cutting (linear interpolation) (G01 code), C1: contour cutting (circular interpolation) (G02 code), and C2: contour cutting (circular interpolation) (G03 code).

Figure 22:
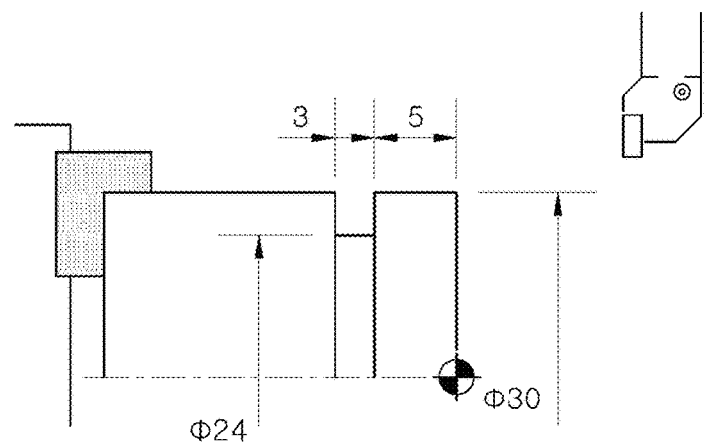

As shown in FIG. 22, G04 code related to dwell is a code that stops the tool feed for a commanded time, and may be used mainly for the purpose of cutting chips in groove cutting and drilling, and the command method may be "G04 P___ (or select one of U__, X__)".

Figure 23:
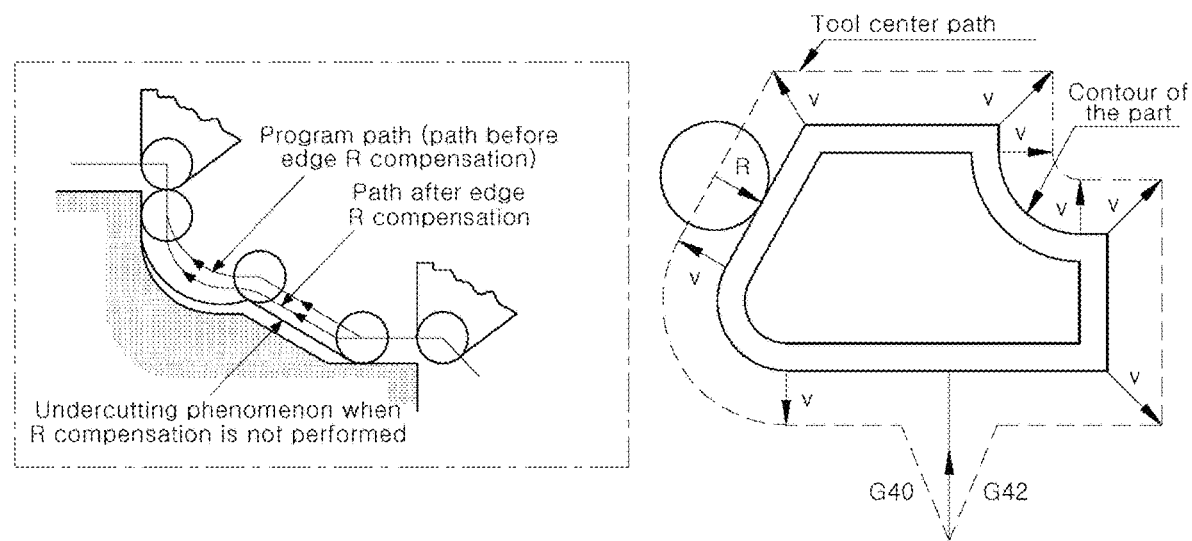
Figure 24:
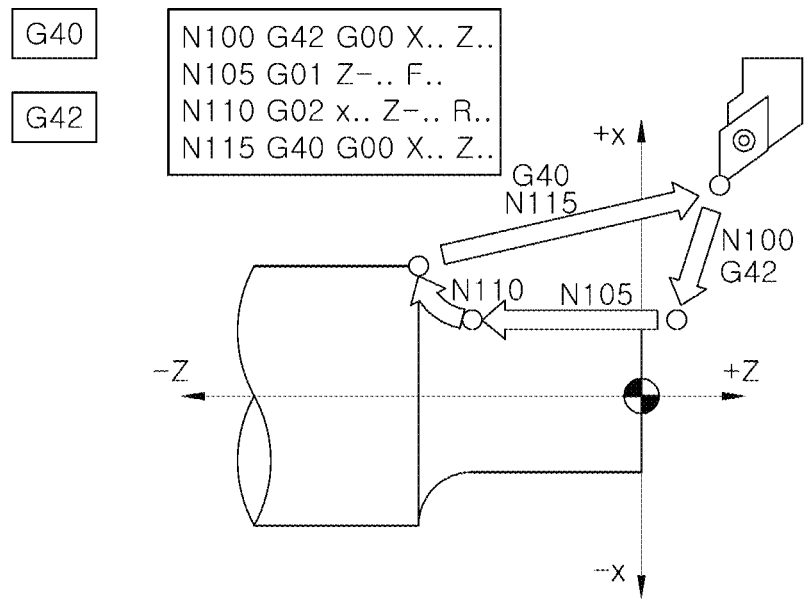
Figure 24:
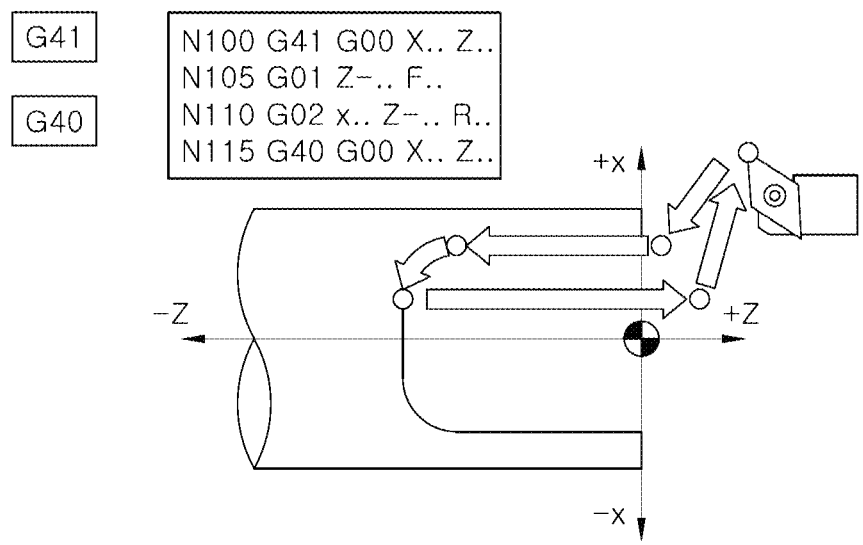

As shown in FIGS. 23 and 24, G40 code, G41 code, and G42 code may be codes related to edge R compensation. Generally, there is an edge R at the tip of the tool blade, and it is very difficult to calculate by considering the edge R value when writing an actual program, so overcutting or undercutting may occur in taper cutting and circular cutting. The edge R compensation may automatically compensate for such errors.

Figure 25:
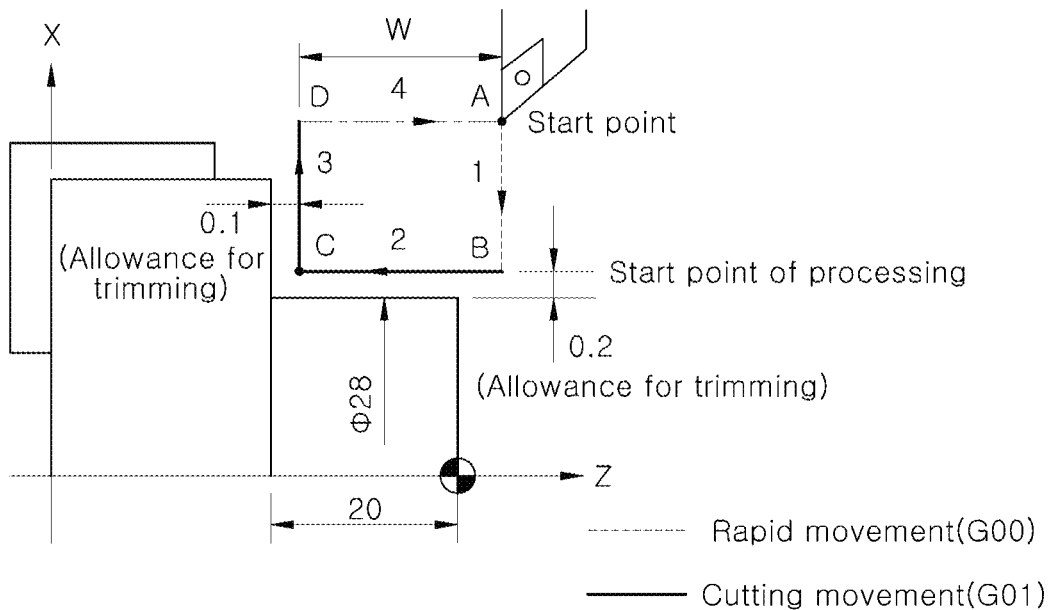

As shown in FIG. 25, G90 code related to the inner and outer diameter cutting cycle, which is a single fixed cycle, may be used when roughing is repeated in step machining or taper machining. In other words, roughing or thread cutting in lathe machining is impossible with a single cut, so repeated several times. G90 code may process the process of A→B→C→D as a single cycle, and may start from the initial point A and return to the initial point A, and may execute straight cutting when R(I) is not specified or is 0. The command method may be "G90 X(U)__Z(W) F__;" for straight cutting, and "G90 X(U)__Z(W)__R(I)__F__;" for taper cutting.

Figure 26:
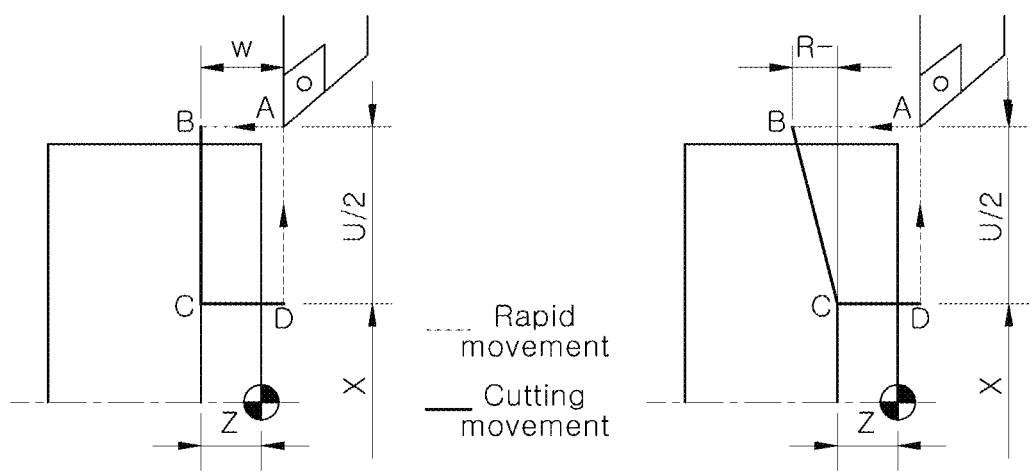

As shown in FIG. 26, G94 code related to the cross-section cutting cycle is a cycle used when cutting a cross-section, and may be mainly used when the length direction of the part to be cut is short and the cross-section direction is large. The command method may be "G94 X(U)__Z(W)__F__;" in the case of cross-section cutting, and "G94 X(U)__Z(W)__R(I)__F__;" in the case of cross-section taper cutting.

Figure 27:
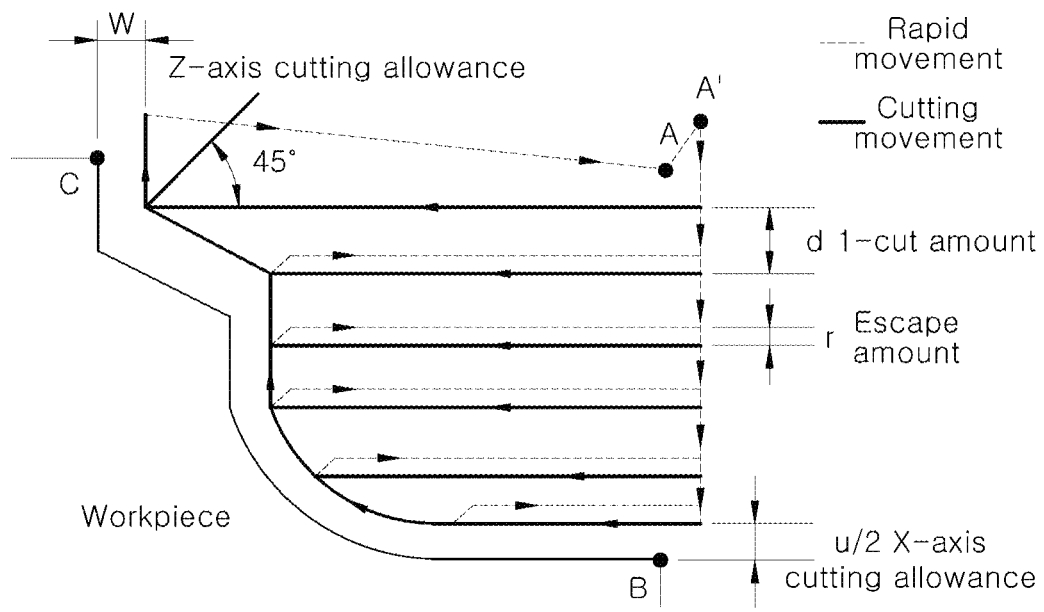
Figure 28:
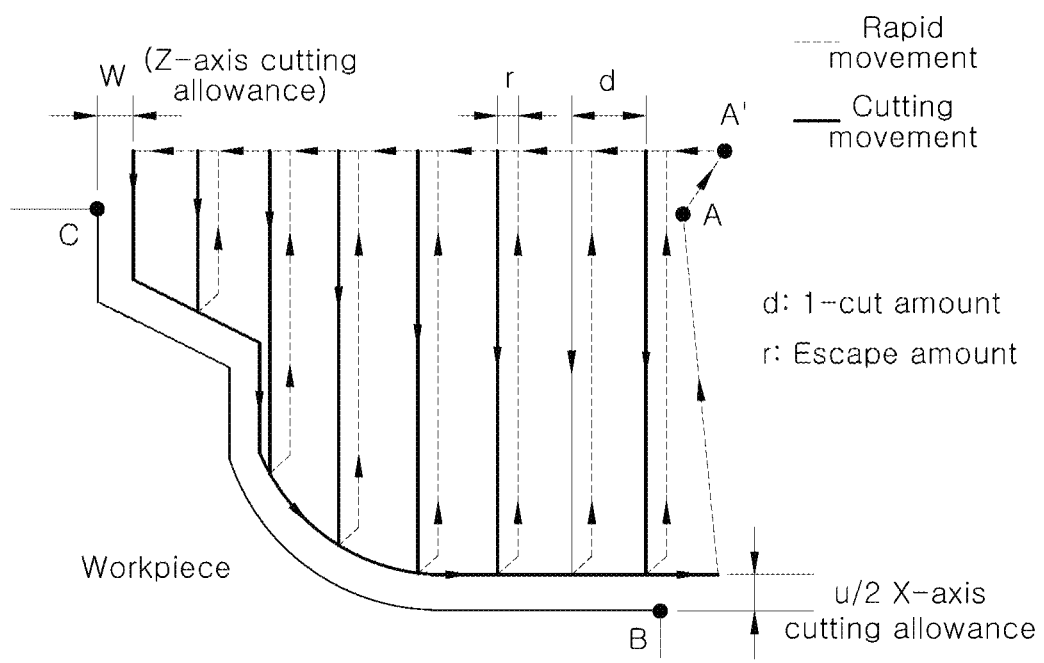
Figure 29:
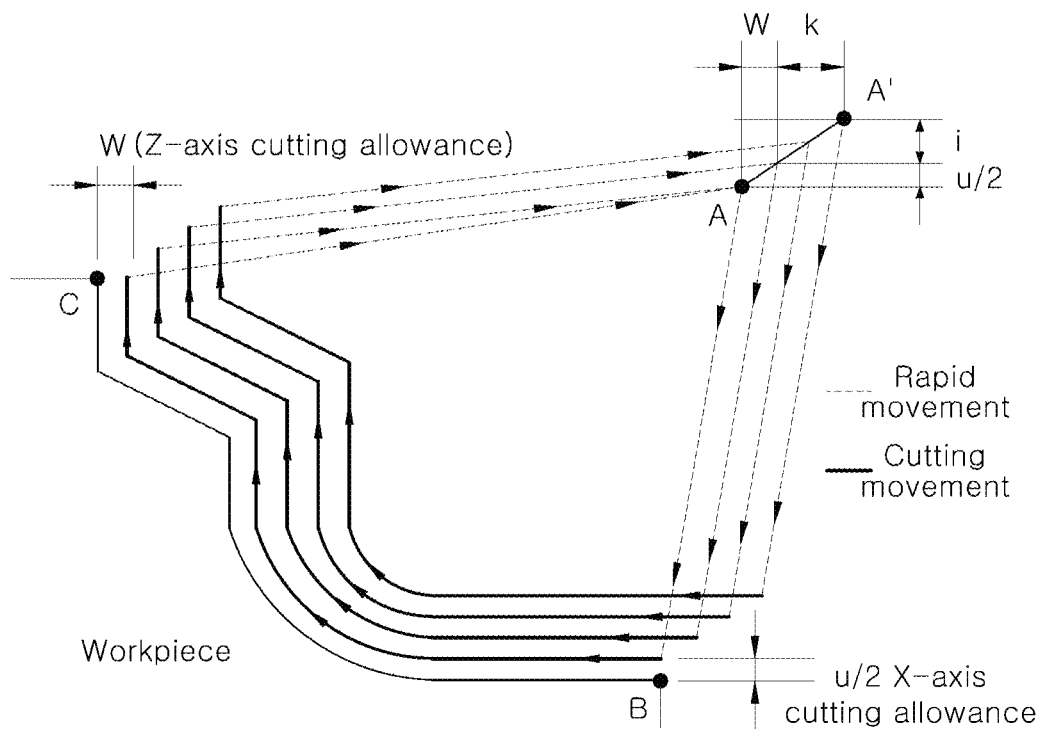

As shown in FIGS. 27 to 29, G71 code related to the inner and outer diameter roughing cycle, which is a composite fixed cycle, G72 code related to the cross-section machining cycle, and G73 code related to the copying machining cycle may have a function to automatically determine the tool path when the final shape and cutting conditions of the product are specified, and when the final shape and cutting conditions are specified, the cutting is performed until only the finishing allowance remains, and then the cycle may be returned to the initial point. The command method may be "G71 U(d) R (e) G71 P(p) Q(q) U(u) W(w) F(f); Np G00 X_; Nq---;" in the case of the inner and outer diameter roughing cycle.

Meanwhile, G98 code related to the feed per minute is a command for how much the tool is fed per minute with F, and is mainly used in machining centers, and the command method may be "G98F___;". In addition, G99 code related to the feed per revolution is a command for how much the tool is moved per spindle revolution with F, and is mainly used in a CNC lathe, and the command method may be "G99 F__;".

For example, as shown in FIG. 30, in the case that the current process is a cutting state (A), the edge device 61 may receive only a portion of data TD3 of a preset data format DF corresponding to the cutting state (A) among the entire data TD of the data format DF from the machine tool 60 at a cycle faster than the preset cycle. At this time, the entire data TD of the data format DF may include at least one of cutting data, movement data, standby data, or load data, and the portion of data TD3 of the data format DF may be cutting data, and the remaining data excluding the portion of data TD3 of the data format DF may be at least one of movement data, standby data, or load data.

The data transmission process between the edge device 61 and the machine tool 60 according to the present disclosure may transmit only partial data TD1 of the data format DF to the edge device 61 at a faster cycle than the preset cycle in the case that the current process is a cutting state (A) based on the NC code currently being executed by the machine tool 60, thereby transmitting more data per unit time.

Meanwhile, the data transmission process between the edge device 61 and the machine tool 60 according to the present disclosure may transmit data quickly by removing the garbage collector when in the cutting state, or may empty the memory by using the garbage collector when in the standby state or the moving state.

According to the present disclosure, a user (e.g., a smart factory solution) may access information on a machine tool in various environments using a digital twin, and thus, may grasp the operating status, the production status, and the like of the machine tool.

Furthermore, according to the present disclosure, by collecting only data that is suitable for the status of the machine tool, the amount of data that may be extracted per unit time may be maximized while reducing the load on the controller of the machine tool.

In addition, by providing a cloud-based service, a message queuing method, a plurality of data collectors, and the like, the effect of minimizing data loss is provided.

Meanwhile, the disclosed embodiments may be implemented in the form of a recording medium storing instructions executable by a computer. The instructions may be stored in the form of program codes, and when executed by a processor, may generate a program module to perform the operations of the disclosed embodiments. The recording medium may be implemented as a computer-readable recording medium.

The computer-readable recording medium includes all types of recording media storing instructions that can be deciphered by a computer. For example, there may be ROM (Read Only Memory), RAM (Random Access Memory), a magnetic tape, a magnetic disk, a flash memory, an optical data storage device, and the like.

The disclosed embodiments have been described with reference to the attached drawings as described above. Those skilled in the art will understand that the present disclosure may be implemented in forms other than the disclosed embodiments without changing the technical idea or essential features of the present disclosure. The disclosed embodiments are exemplary and should not be construed as limiting.

What is claimed is:

1. A method for monitoring a machine tool using a digital twin, comprising:
    requesting, by an edge device, machining data for an operation of the machine tool in real time using a query different for each detailed process existing within one machining process to the machine tool;
    generating, by the machine tool, machining data including at least one of cutting data, movement data, or standby data for the operation of the machine tool corresponding to the query; and
    receiving, by the edge device, the machining data from the machine tool in real time;
    wherein, when the edge device receives the machining data from the machine tool,
    the edge device is configured to receive data of a preset data format in response to corresponding machining data among the machining data at a preset cycle, wherein,
    based on a request of subscription related to cutting from the machine tool by the edge device,
    the machine tool is configured to:
    select at least one specific machining data corresponding to a cutting mode related to the cutting during the current process,
    transmit only partial data of the preset data format at a faster cycle than a preset cycle in response to the selected specific processed data to the edge device to subscribe to the selected specific processed data.

2. The method of claim 1, wherein,
    based on the machining data being the cutting data,
    the edge device is configured to receive only partial data of the preset data format at the faster cycle than the preset cycle in response to the cutting data.

3. The method of claim 2, wherein,
    based on the machining data being the standby data,
    the edge device is configured to receive all data of the preset data format at a slower cycle than the preset cycle in response to the standby data.

4. The method of claim 1, wherein,
    the edge device is configured to:
    further set at least one of a processing time, a processing cycle, or a processing duration according to the operating state of the machine tool.

5. The method of claim 4, wherein,
    requesting, by the edge device, the machining data for an operation of the machine tool in real time using a query further includes:
    requesting the machining data for the operation of the machine tool in real time according to a priority or a call sequence,
    the query includes information for the priority or the cycle of the requested machining data.

6. The method of claim 5, wherein,
    a user requests the machining data to the digital twin through an authentication procedure, and
    the method further comprising:
    when the machining data for the operation of the machine tool is transmitted from the edge device to a digital twin service platform,
    charging, by the digital twin service platform, the user according to an amount of the machining data of the digital twin used by the user.

7. The method of claim 6, further comprising:
    when the machining data for the operation of the machine tool is transmitted from the edge device to a digital twin service platform,
    reproducing, by the digital twin service platform, the operation of the machine tool in real time or at a specific time in the past by using the digital twin.

8. The method of claim 7, further comprising:
    when the machining data for the operation of the machine tool is transmitted from the edge device to a digital twin service platform,
    analyzing, by the digital twin, the collected machining data based on artificial intelligence (AI); and
    predicting, by the digital twin service platform, an operation time or failure time of the machine tool using the analyzed result.

9. A non-transitory computer-readable recording medium storing a computer program combined with a hardware computer device for executing the method for monitoring a machine tool of claim 1.

10. A method for monitoring a machine tool using a digital twin, comprising:
    requesting, by an edge device, machining data for an operation of the machine tool in real time using a query different for each detailed process existing within one machining process to the machine tool;
    generating, by the machine tool, machining data including at least one of cutting data, movement data, or standby data for the operation of the machine tool corresponding to the query; and
    receiving, by the edge device, the machining data from the machine tool in real time;

wherein, when the edge device receives the machining data from the machine tool, the edge device is configured to receive data of a preset data format in response to corresponding machining data among the machining data at a preset cycle, wherein, the edge device is configured to:

receive an NC code, which is currently executing, from the machine tool, based on the received NC code, which is currently executing, determine whether the current process is in a cutting state, a moving state, or a standby state, and based on the current process being in the cutting state, receive only partial data of the preset data format at a faster cycle than the preset cycle in response to the cutting state.

11. A system for monitoring a machine tool using a digital twin, comprising:

an edge device configured to request machining data for an operation of the machine tool in real time using a query different for each detailed process existing within one machining process to the machine tool;

a machine tool configured to generate machining data including at least one of cutting data, movement data, or standby data for the operation of the machine tool corresponding to the query, and transmit the machining data to the edge device in real time;

wherein, when the edge device receives the machining data from the machine tool, the edge device is configured to receive data of a preset data format in response to corresponding machining data among the machining data at a preset cycle, wherein, based on a request of subscription related to cutting from the machine tool by the edge device, the machine tool is configured to:

select at least one specific machining data corresponding to a cutting mode related to the cutting during the current process, transmit only partial data of the preset data format at a faster cycle than the preset cycle in response to the selected specific processed data to the edge device to subscribe to the selected specific processed data.

12. The system of claim 11, wherein, the edge device includes at least two data collectors, and based on a first data collector included in the at least two data collectors being not in operation, a second data collector included in the at least two data collectors further collects the requested machining data as a replacement for the first data collector.

13. The system of claim 12, wherein, the edge device includes a message queue, and based on the message queue being not connected to a server, the message queue is configured to queue the machining data received from one of the at least two data collectors based on a memory storage device.

14. The system of claim 13, wherein, the edge device includes a data transmitter, and the data transmitter is configured to:

connect to a unidirectional IP network from the edge device with a specific IP (Internet Protocol) set to the server, block an access from other external devices to the edge device with the specific IP, receive the processed data from a message queue, and transmit the processed data to the server using the unidirectional IP network.

* * * * *